(12) United States Patent
Hill

(10) Patent No.: US 11,934,794 B1
(45) Date of Patent: Mar. 19, 2024

(54) SYSTEMS AND METHODS FOR ALGORITHMICALLY ORCHESTRATING CONVERSATIONAL DIALOGUE TRANSITIONS WITHIN AN AUTOMATED CONVERSATIONAL SYSTEM

(71) Applicant: Knowbl LLC, Ponte Vedra Beach, FL (US)

(72) Inventor: Parker Hill, Reno, NV (US)

(73) Assignee: Knowbl Inc., Northville, MI (US)

( * ) Notice: Subject to any disclaimer, the term of this patent is extended or adjusted under 35 U.S.C. 154(b) by 0 days.

(21) Appl. No.: 18/373,911

(22) Filed: Sep. 27, 2023

Related U.S. Application Data

(60) Provisional application No. 63/412,350, filed on Sep. 30, 2022.

(51) Int. Cl.
| | | |
|---|---|---|
| *G06F 40/35* | (2020.01) | |
| *G06F 40/284* | (2020.01) | |
| *G10L 15/22* | (2006.01) | |

(52) U.S. Cl.
CPC ............ *G06F 40/35* (2020.01); *G06F 40/284* (2020.01)

(58) Field of Classification Search
CPC ........ G06F 16/35; G06F 18/23; G06F 40/279; G06F 40/284; G06F 40/30; G06F 40/35; G06F 16/36; G06F 16/367; G10L 15/16; G10L 15/22
USPC .... 704/1, 8, 10, 232, 275, 9; 706/20, 46, 47
See application file for complete search history.

(56) References Cited

U.S. PATENT DOCUMENTS

| | | | | |
|---|---|---|---|---|
| 10,796,104 | B1* | 10/2020 | Lee | G06F 40/284 |
| 10,991,369 | B1* | 4/2021 | Borisov | G06F 40/30 |
| 11,392,773 | B1* | 7/2022 | Gangadharaiah | G06F 40/35 |
| 11,657,307 | B1* | 5/2023 | Bodapati | G06F 40/30 |
| | | | | 706/15 |
| 11,876,758 | B1* | 1/2024 | Mueller | G06F 40/35 |
| 2004/0220809 | A1* | 11/2004 | Wang | G06F 40/216 |
| | | | | 704/257 |
| 2012/0053945 | A1* | 3/2012 | Gupta | G10L 15/22 |
| | | | | 704/256 |
| 2016/0202957 | A1* | 7/2016 | Siddall | G06F 40/186 |
| | | | | 717/109 |
| 2016/0224537 | A1* | 8/2016 | Starostin | G06F 40/30 |

(Continued)

FOREIGN PATENT DOCUMENTS

| | | | | |
|---|---|---|---|---|
| WO | WO-2019172878 A1 * | 9/2019 | | G06F 40/20 |
| WO | WO-2021254411 A1 * | 12/2021 | | G06F 16/33 |

*Primary Examiner* — Martin Lerner

(74) *Attorney, Agent, or Firm* — Padowithz Alce; Quintin Scheitlin; Alce PLLC

(57) ABSTRACT

A system and method for algorithmically orchestrating conversational dialogue transitions within an automated conversational system may include extracting a set of slots defined within a plurality of utterances and converting the plurality of utterances to a plurality of skeleton utterances. The method may also include grouping the plurality of skeleton utterances into a plurality of skeleton utterance groups, identifying a plurality of valid slot transition pairs based on an assessment of the plurality of skeleton utterance groups, and deriving a plurality of slot ontology groups based on the plurality of valid slot transition pairs. The system and method may use the plurality of distinct slot ontology groups and the plurality of skeleton utterances to facilitate contextually relevant dialogue transitions in the automated conversational system.

20 Claims, 8 Drawing Sheets

(56) References Cited

U.S. PATENT DOCUMENTS

| | | | |
|---|---|---|---|
| 2017/0228366 A1* | 8/2017 | Bui | G06F 40/284 |
| 2017/0287478 A1* | 10/2017 | Schulz | G10L 15/22 |
| 2018/0121415 A1* | 5/2018 | Perez | G06F 40/35 |
| 2018/0129484 A1* | 5/2018 | Kannan | G06F 40/30 |
| 2020/0081975 A1* | 3/2020 | Yadav | G06F 40/30 |
| 2020/0193265 A1* | 6/2020 | Hill | G06F 40/35 |
| 2020/0257857 A1* | 8/2020 | Peper | G06F 40/35 |
| 2021/0358486 A1* | 11/2021 | Lee | G06F 40/216 |
| 2022/0318518 A1* | 10/2022 | Mars | G06F 40/44 |
| 2023/0069049 A1* | 3/2023 | Zhou | G06F 40/30 |
| 2023/0105453 A1* | 4/2023 | Lavi | G06F 40/30 |
| | | | 704/9 |
| 2023/0120940 A1* | 4/2023 | Qiu | G06F 40/284 |
| | | | 704/245 |
| 2023/0350928 A1* | 11/2023 | Hill | G06F 40/284 |

\* cited by examiner

SYSTEMS AND METHODS FOR ALGORITHMICALLY ORCHESTRATING CONVERSATIONAL DIALOGUE TRANSITIONS WITHIN AN AUTOMATED CONVERSATIONAL SYSTEM

CROSS-REFERENCE TO RELATED APPLICATIONS

This application claims the benefit of U.S. Provisional Application No. 63/412,350, filed 30 Sep. 2022, which is incorporated in its entirety by this reference.

TECHNICAL FIELD

This invention relates generally to the machine learning-based query response generation field, and more specifically, to a new and useful system and method for automatically configuring and implementing a machine learning-based virtual dialogue agent.

BACKGROUND

Automated query response and/or query search systems may typically be deployed to enable users to discover answers to various questions. Many of the automated query response and/or search systems are naïve, in operation, and often only use regular expression searching techniques to provide response to queries. A fundamental problem with such automated response systems may be their incapability to deliver useful responses to queries that may be posed in a manner inconsistent with patterns of potential responses in a search space. Accordingly, using regex or similar search techniques, these automated query response systems may fail in providing responses to non-conforming queries.

Additionally, in circumstances in which multiple related queries may be posed by a user in a querying session or the like, the automated query response systems may not be able to identify, much less maintain, a context of the multiple queries to enable a production of best responses to the multiple queries.

Thus, there is a need in the automated query search and response fields to create new and useful systems and methods for implementing machine learning-based context generation and intelligent context-informed query search and response. The embodiments of the present application described herein provide technical solutions that address, at least, the needs described above, as well as the deficiencies of the state of the art.

BRIEF SUMMARY OF THE INVENTION(S)

In one embodiment, a method for enhancing predictive dialogue inferences of a machine learning-based automated dialogue system includes at a remote machine learning-based automated dialogue service: sourcing, into a dedicated knowledge database, a corpus of transitionless data of a subscriber to the remote machine learning-based automated dialogue service, the corpus of transitionless data comprising a plurality of utterances; identifying, by a slot extraction machine learning model executed by one or more computers, a set of one or more slot values within each of the plurality of utterances; converting, by the one or more computers, the plurality of utterances to a plurality of skeleton utterances by masking the set of one or more slot values identified within each of the plurality of utterances, wherein masking the set of one or more slot values includes replacing each identified slot value of the set of one or more slot values with a random slot variable; grouping, by the one or more computers, the plurality of skeleton utterances into a plurality of skeleton utterance groups based on embedding values of the plurality of skeleton utterances; identifying, by the one or more computers, a plurality of valid slot transition pairs based on a pairwise analysis of potentially interchangeable slot values; deriving, by the one or more computers, a plurality of slot value ontology groups based on the plurality of valid slot transition pairs; and using, by the one or more computers, the plurality of distinct slot ontology groups and the plurality of skeleton utterances to configure the dedicated knowledge database, wherein configuring the dedicated knowledge database includes: automatically encoding the dedicated knowledge database with a plurality of metadata transition values between distinct pairs of utterances of the plurality of utterances that digitally associates each of the distinct pairs of utterances as likely transitions in a given dialogue session between a user and an automated dialogue system operated by the machine learning-based automated dialogue service based on the plurality of distinct slot ontology groups; and once encoded, implementing the dedicated knowledge database in a production environment that enables an execution the automated dialogue system in a plurality of automated conversations using the plurality of metadata transition values of the dedicated knowledge base to automatically predict transitionary responses based on user utterances in multi-turn conversations that likely include a changes in dialogue intents.

In some embodiments, a method for algorithmically orchestrating conversational dialogue transitions within an automated conversational system includes extracting, by a machine learning model, a set of slots defined within a plurality of utterances; converting, by the one or more computers, the plurality of utterances to a plurality of skeleton utterances based on masking the set of slots defined in the plurality of utterances; grouping, by the one or more computers, the plurality of skeleton utterances into a plurality of skeleton utterance groups based on embedding values of the plurality of skeleton utterances; identifying, by the one or more computers, a plurality of valid slot transition pairs based on a pairwise analysis of potentially interchangeable slot values within each of the plurality of skeleton utterance groups; deriving, by the one or more computers, a plurality of slot ontology groups based on the plurality of valid slot transition pairs; and using, by the one or more computers, the plurality of distinct slot ontology groups and the plurality of skeleton utterances to facilitate contextually relevant dialogue transitions in the automated conversational system.

In some embodiments, deriving the plurality of distinct slot ontology groups based on the plurality of valid slot transition pairs includes: iterating through each of the plurality of valid slot transition pairs, and at each iteration: determining, by the one or more computers, if slot values associated with a current slot transition pair are transitively related to slot values in one or more existing slot ontology groups, adding, by the one or more computers, the slot values associated with the current slot transition pair to an existing slot ontology group when the slot values associated with the current slot transition pair are determined to be transitively related to slot values in the existing slot ontology group, and forming, by the one or more computers, a new slot ontology group and incorporating the slot values associated with the current slot transition pair into the new slot ontology group when the slot values associated with the current slot transition pair are determined to not be transitively related to the slot values within the one or more existing slot ontology groups.

In some embodiments, determining if the slot values associated with the current slot transition pair are transitively related to the slot values in a respective existing slot ontology group includes: searching, by the one or more computers, for a transitive relationship between the slot values associated with the current slot transition pair and the slot values in the respective existing slot ontology group, confirming, by the one or computers, that the slot values associated with the current slot transition pair are transitively related to the slot values in the respective existing slot ontology group based on an existence of the transitive relationship, and disconfirming, by the one or computers, that the slot values associated with the current slot transition pair are transitively related to the slot values in the respective existing slot ontology group based on an absence of the transitive relationship.

In some embodiments, the automated conversational system is configured to (i) compute a likely dialogue intent of user utterances received from a user and (ii) extract slots from the user utterances received from the user, and using the plurality of distinct slot ontology groups to generate a response to a subsequent user utterance received from the user includes: identifying, by the one or more computers, the likely dialogue intent of a user utterance preceding the subsequent user utterance, generating, by the one or more computers, a plurality of semantic follow-up candidate utterances based on one or more slot ontology groups associated with the user utterance preceding the subsequent user utterance, computing, by the one or more computers, a plurality of classification scores for each of the plurality of semantic follow-up candidate utterances, the plurality of utterances, and at least a subset of the plurality of skeleton utterances, and generating, by the one or more computers, a response to the subsequent user utterance based on a highest classification score among the plurality of classification scores.

In some embodiments, when a classification score corresponding to a respective one of the plurality of semantic follow-up candidate utterances scores highest amongst the plurality of classification scores, generating the response to the subsequent user utterance includes: generating the response based on the likely dialogue intent of the user utterance preceding the subsequent user utterance and a slot associated with the respective one of the plurality of semantic follow-up candidate utterances.

In some embodiments, the user utterance preceding the subsequent user utterance includes a first slot related to a first distinct slot ontology group, the first distinct slot ontology group comprises the first slot and one or more other slots, and generating, by the one or more computers, the plurality of semantic follow-up candidate utterances includes generating a semantic follow-up candidate utterance for each of the other slots in the first distinct slot ontology group.

In some embodiments, when a classification score corresponding to a respective one of the plurality of skeleton utterances scores highest amongst the plurality of classification scores, generating the response to the subsequent user utterance includes: generating the response based on a slot associated with the user utterance preceding the subsequent user utterance and the respective one of the plurality of skeleton utterances.

In some embodiments, the subset of the plurality of utterances includes skeleton utterances relating to slots in each slot ontology group associated with each slot in the user utterance preceding the subsequent user utterance.

In some embodiments, converting each utterance of the plurality of utterances to a corresponding skeleton utterance includes identifying, by the one or more computers, one or more slots defined within a target utterance, and masking, by the one or more computers, each of the one or more slots identified in the target utterance with a corresponding slot identifier or slot variable.

In some embodiments, performing the pairwise analysis of potentially interchangeable slot values within each of the plurality of skeleton utterance groups includes: identifying, by the one or more computers, a plurality of slot identifiers or slot variables present in skeleton utterances associated with a target skeleton utterance group, building, by the one or more computers, a set of potentially interchangeable slot pairs based on distinct pair combinations of the plurality of slot identifiers, performing, by the one or more computers, the pairwise analysis on each potentially interchangeable slot pair of the set of potentially interchangeable slot pairs, and determining, by the one or more computers, valid interchangeable slot pairs from the set of potentially interchangeable slot pairs based on results of the pairwise analysis on the each potentially interchangeable slot pair.

In some embodiments, performing the pairwise analysis on each potentially interchangeable slot includes: identifying, by the one or more computers, a first skeleton utterance and a second skeleton utterance of the plurality of skeleton utterances that corresponds to a first slot identifier and a second slot identifier in a target potentially interchangeable slot pair, generating, by the one or more computers, a plurality of instances of the first skeleton utterance based on replacing the first slot identifier in the first skeleton utterance with slots corresponding to the target potentially interchangeable slot pair, generating, by the one or more computers, a plurality of instances of the second skeleton utterance based on replacing the second slot identifier in the second skeleton utterance with slots corresponding to the target potentially interchangeable slot pair, and computing, by the one or more computers, a semantic similarity score for the plurality of instances of the first skeleton query and a semantic similarity score for the plurality of instances of the second skeleton query.

In some embodiments, determining valid interchangeable slot pairs from the set of potentially interchangeable slot pairs includes: determining, by the one or more computers, the target potentially interchangeable slot pair to be valid when the semantic similarity score computed for the plurality of instances of the first skeleton query and the second skeleton query exceeds a similarity score of the first skeleton query and the second skeleton query.

In some embodiments, the first slot identifier of the target potentially interchangeable slot pair corresponds to a first slot and the second slot identifier of the target potentially interchangeable slot pair corresponds to a second slot, and generating the plurality of instances of the first skeleton utterance and the second skeleton utterance includes generating: a first instance of the first skeleton query with the first slot installed at a location of the first slot identifier in the first skeleton query, a second instance of the first skeleton query with the second slot installed at the location of the first slot identifier in the first skeleton query, a first instance of the second skeleton query with the second slot installed at a location of the second slot identifier in the second skeleton query, and a second instance of the second skeleton query with the first slot installed at the location of the second slot identifier in the second skeleton query.

In some embodiments, grouping the plurality of skeleton utterances into the plurality of skeleton utterance groups includes: computing, by an embeddings model, an embedding value for each of the plurality skeleton utterances, providing, to an unsupervised machine learning model, an input comprising the embedding value computed for each of the plurality of skeleton utterances, and generating, via the unsupervised machine learning model, the plurality of skeleton utterance groups based on the input.

In some embodiments, the embedding value of a respective skeleton utterance relates to a vector comprising a plurality of numerical values that map semantic features of the respective skeleton utterance to a multi-dimensional space, and skeleton utterances with similar embedding values are grouped in a same skeleton utterance group.

In some embodiments, the plurality of utterances are sourced from one or more knowledgebases obtained from a subscriber, and the one or more knowledgebases comprise unstructured utterance-answer data.

In some embodiments, the one or more knowledgebases relate to one of a frequently asked questions (FAQ) repository, a hierarchical digital artifact repository, or website data.

In some embodiments, a method includes extracting, by a machine learning model, a set of slots defined within a plurality of utterances; converting, by the one or more computers, the plurality of utterances to a plurality of skeleton utterances; grouping, by the one or more computers, the plurality of skeleton utterances into a plurality of skeleton utterance groups; identifying, by the one or more computers, a plurality of valid slot transition pairs based on an assessment of the plurality of skeleton utterance groups; deriving, by the one or more computers, a plurality of slot ontology groups based on the plurality of valid slot transition pairs; and using, by the one or more computers, the plurality of distinct slot ontology groups and the plurality of skeleton utterances to facilitate contextually relevant dialogue transitions in the automated conversational system.

In some embodiments, the assessment of the plurality of skeleton utterance groups includes a pairwise analysis of potentially interchangeable slot values of semantically similar skeleton utterances within each of the plurality of skeleton utterance groups.

In some embodiments, converting the plurality of utterance to the plurality of skeleton utterance includes masking the set of slots defined in the plurality of utterances.

In one embodiment, a method of augmenting predictive dialogue reasoning in a machine learning-based automated dialogue system, the method comprising: importing, into a subscriber-specific database, subscriber data containing a plurality of utterances without relational encodings between the plurality of utterances; using a slot extraction machine learning model, executed by one or more computers, to identify slot values within each of the plurality of utterances; transforming, by the one or more computers, the plurality of utterances into a plurality of skeleton utterances by substituting the identified slot values with random slot variables; categorizing the plurality of skeleton utterances into a plurality of groups of skeleton utterances based on embedding values of each of the plurality of skeleton utterances; establishing, by the one or more computers, likely pairs of slot values of the identified slot values that, when subject pair of slot values of the likely pairs of slot values is substituted into a designated slot position of a given skeleton utterance of the plurality of skeleton utterances, create a pair of utterances having embedding values that are within a determined distance indicating a likelihood that the subject pair of slot values are semantically related; generating slot value ontology groups based on the establishing the likely pairs of slot values; utilizing the slot value ontology groups to configure the subscriber-specific database with relational encodings between the plurality of utterances, wherein configuring the subscriber-specific database includes: encoding, with reference to the slot ontology groups, the subscriber-specific database with transitional relationship metadata values between pairs of the plurality of utterances having one or more of the likely pairs of slot values; and integrating the subscriber-specific database in a production environment that enables the automated dialogue system to use the subscriber-specific database to generate predictive responses in multi-turn conversation considering likely dialogue intent changes.

DESCRIPTION OF THE PREFERRED EMBODIMENTS

Figure 1:
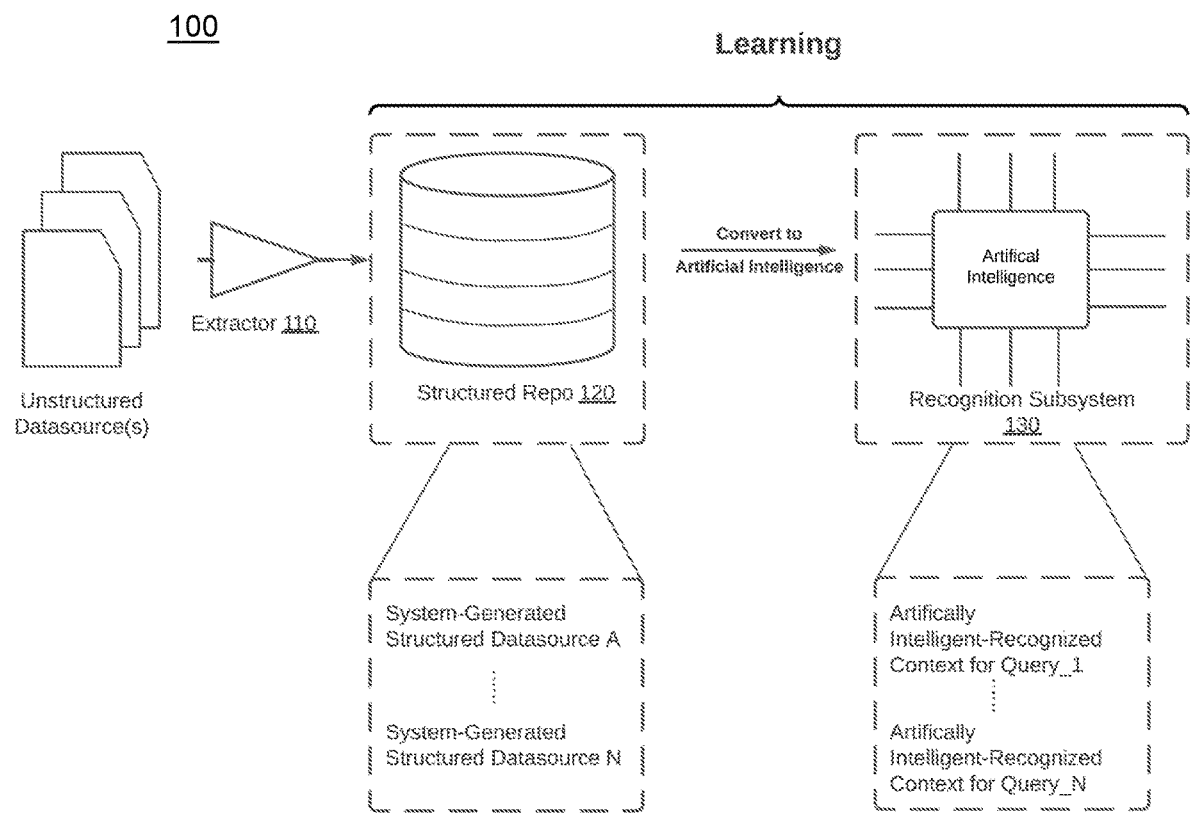
FIG. 1 illustrates a schematic representation of a system 100 in accordance with one or more embodiments of the present application.

The following description of the preferred embodiments of the invention is not intended to limit the invention to these preferred embodiments, but rather to enable any person skilled in the art to make and use this invention.

Overview

A given subscriber to an automated dialogue service implemented by the system 100 and/or using the method 200 may have a corpus of raw or transitionless utterance data that may lack metadata or similar digital markers indicating transitional relationships between various pairs of the utterances within the corpus. Without transition metadata tags or markers, the predictions by an automated dialogue system of a likely response to a user utterance or input may be less accurate and may derail the continuity or the flow of a dialogue or conversation with the user. Namely, in a multi-turn conversation with an automated dialogue system, a user's dialogue intent may change between a sequence of utterances therefore potentially causing the automated dialogue system to produce low quality response inferences to the user input because the change of a dialogue intent of a previous utterance and a subsequent utterance in the sequence.

However, transition tags as implemented in one or more embodiments of the present application may create a transitional relationship between predictive responses having different dialogue intents, which may be available to the automated dialogue system via a knowledge base of the automated dialogue system. As described in one or more embodiments of the present application, the system and/or methods may enable a computation of transitional metadata tags for a volume of raw and/or transitionless utterance data. The transitional metadata tags may inform a transitional relationship between two distinct utterances having two distinct dialogue intents, which may allow an automated dialogue system of the present application to transition between the two distinct utterances in the case a user changes or switches between a first dialogue intent of a first or prior utterance and a second or subsequent utterance of the two distinct utterances. That is, while the first utterance may have a first dialogue intent and the second utterance may have a second distinct dialogue intent, the transitional metadata tag between the two utterance may inform a predictive response of the second utterance based on a user's utterance that may trigger an identification of the transitional relationship between the two utterances.

Moreover, because the corpus of raw utterance data may include thousands, tens of thousands, millions, or more distinct utterances having thousands or tens of thousands of distinct dialogue intents, associating or setting transitional relationships between the various distinct pairs of utterances within the corpus presents a computational challenge in identifying transitionally-related pairs and further, creating and storing metadata tags in a manner that can be consumed by an automated dialogue system for predicting accurate responses in an efficient manner (e.g., low latency). That is, the compute power and compute time required for individually assessing and delineating proper transitional relationships for a new corpus of transitionless utterance data may be highly inefficient and untenable without automation. Accordingly, the systems and methods described in the present application provide an advantageous technical solution that automatically ingests a volume of raw or transitionless data, identifies a volume of pairs of transitionally-related content or utterances, creates transitional metadata tags or markers, adapts a target knowledge base containing the corpus with the metadata tags, and makes the utterances and metadata tags available to an automated dialogue system for improving the accuracy and computation time for predictive responses to user utterances. It shall be noted that since, in one or more embodiments of the present application, an adaptation of a dedicated knowledge database storing the corpus of raw utterance data from a subscriber may be performed offline or ahead of a use of the dedicated knowledge base in a production environment, this mitigations a need for real-time computation of transitions or transition metadata of likely transitionable utterances thereby reducing the computation time and computation power required for generating an accurate predictive response in an efficient manner. That is, the systems and techniques of the present application provide additional technical advantages that improve the use of computational resources during an in-production operation of a dedicated knowledge database or subscriber-specific database for producing predictively accurate responses.

1. System for Machine Learning-Based Context Identification, Query Handling and Automatic Response Generation As shown in FIG. 1, a system 100 that may be configured to implement automated query handling using machine learning-based contextual parameters includes a structure extractor 110, a structured query response repository 120, and a context recognition response subsystem 130.

In one or more embodiments, the structure extractor 110 may be configured to identify and extract unstructured data from one or more sources of data and convert the unstructured data to one or more recognized structured data formats of the structured query response repository 120. In such embodiments, the structure extractor 110 may be in operable communication, via the Internet or the like, with one or more sources of unstructured data and similarly, in operable communication with one or more structured repositories of the system 100.

Additionally, or alternatively, the structure extractor 110 may function to implement one or more machine learning models including unsupervised machine learning models, such as a transformer model, for converting the unstructured data to vector representations mapped to an n-dimensional space. In one or more embodiments, the structure extractor may additionally identify and/or discover categories or topics of queries and responses based on an application of one or more machine learning-based clustering techniques. In such embodiments, the structure extractor 110 may function to apply contextual tags or labels based on the resulting clustering or grouping of the structured data.

The structured query response repository 120 may be configured to store formerly unstructured data from one or more sources of data in a structured format that may be suitable for intelligent querying applications. In one or more embodiments, the structured data may be stored in one or more of pre-defined hierarchies and/or tables. Accordingly, the structured query response repository 120 may sometimes be referred to herein as a "dedicated knowledge database" or a "subscriber-specific database". In some embodiments, during an importation or sourcing a corpus of unstructured and/or transitionless data, the system 100 may establish or setup a dedicated knowledge database for a given subscriber to a service implementing the system 100 and/or the method 200. The dedicated knowledge database 120 may be configured using the techniques described herein, e.g., the method 200, to establish transitions or relationship connections between utterances and/or data stored therein. Accordingly, at least one configuration of the dedicated knowledge database 120 may include setting transition tags or transition markers between utterances that establishes a transitional relationship between them. In such embodiments, the transitional relationship tags or markers indicate that either utterance of a pair of transitionally connected utterances may be presented as a response in a multi-turn conversation in the case of a change of a dialogue intent.

Additionally, or alternatively, the structured query response repository 120 may function to store contextual labels or tags, as metadata, in association with each structured response item. It shall be recognized that the structured query response repository 120 may function to implement any suitable data structure for organizing, structuring, and/or storing data.

In one or more embodiments, the context recognition response subsystem 130 may include a plurality of distinct query handling routes configured to handle a target query in either a contextless manner or in a manner with previous context (e.g., antecedent context).

Additionally, or alternatively, the context recognition response subsystem 130 may implement one or more ensembles of pre-trained or trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, Mobile-BERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

Figure 2:
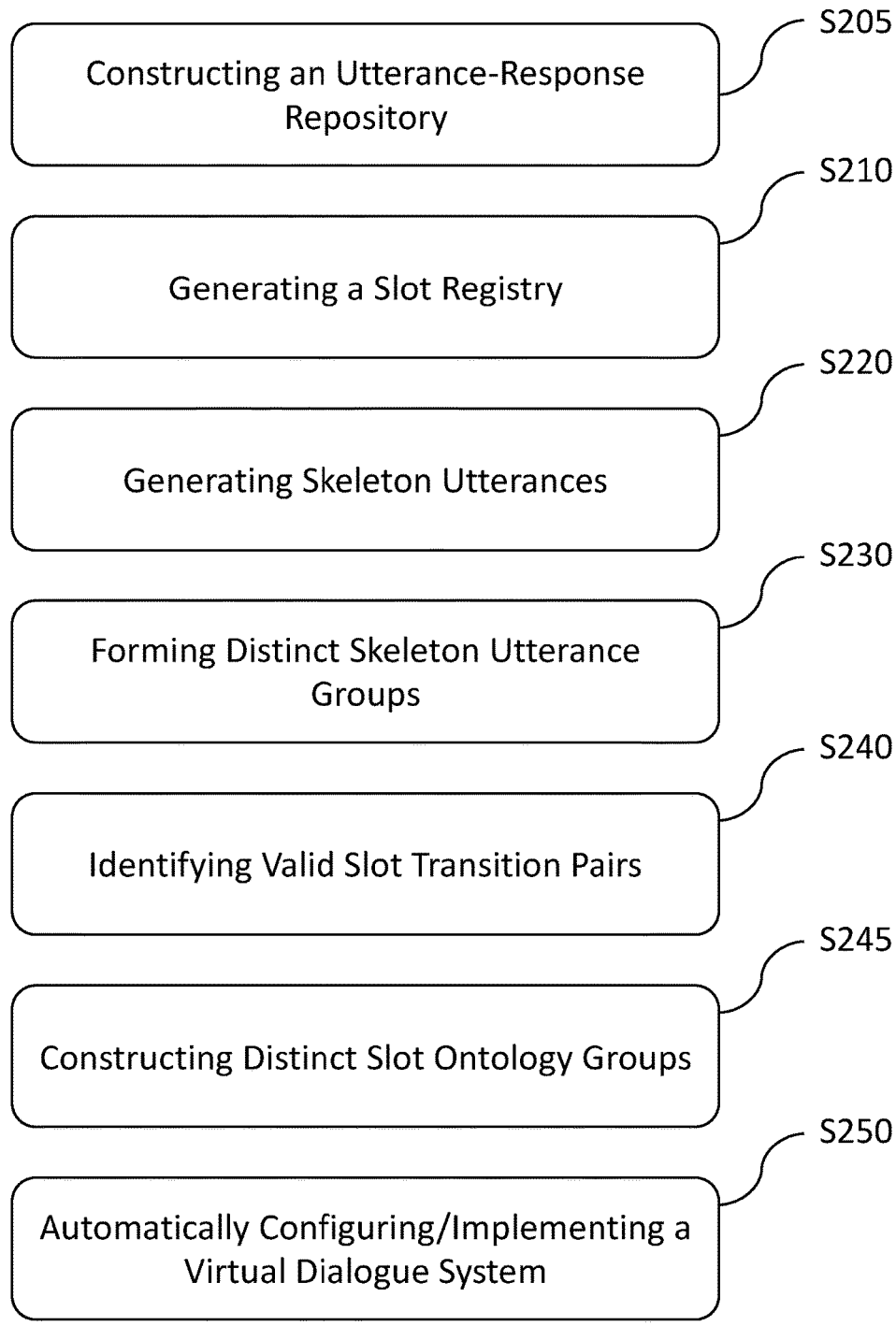
FIG. 2 illustrates an example method 200 in accordance with one or more embodiments of the present application.

2.00 Machine Learning-Based Method for Automatically Configuring and Implementing a Context-Aware Virtual Dialogue System As shown in FIG. 2, a machine learning-based method for automatically configuring and implementing a context-aware virtual dialogue system may include constructing an utterance-response repository (S205), generating a slot registry (S210), generating skeleton utterances (S220), forming distinct skeleton utterance groups (S230), identifying valid slot transition pairs (S240), and automatically configuring/implementing a virtual dialogue system (S250).

2.05 Constructing an Utterance-Response Repository

S205, which includes constructing an utterance-response repository, may function to construct/derive the utterance-response repository based on one or more subscriber-defined data sources and/or knowledge bases. In some embodiments, the utterance-response repository, once constructed, may include (e.g., store) a plurality of utterance-response entries that may be referenced and/or accessed by one or more downstream operations of method 200.

Figure 3:
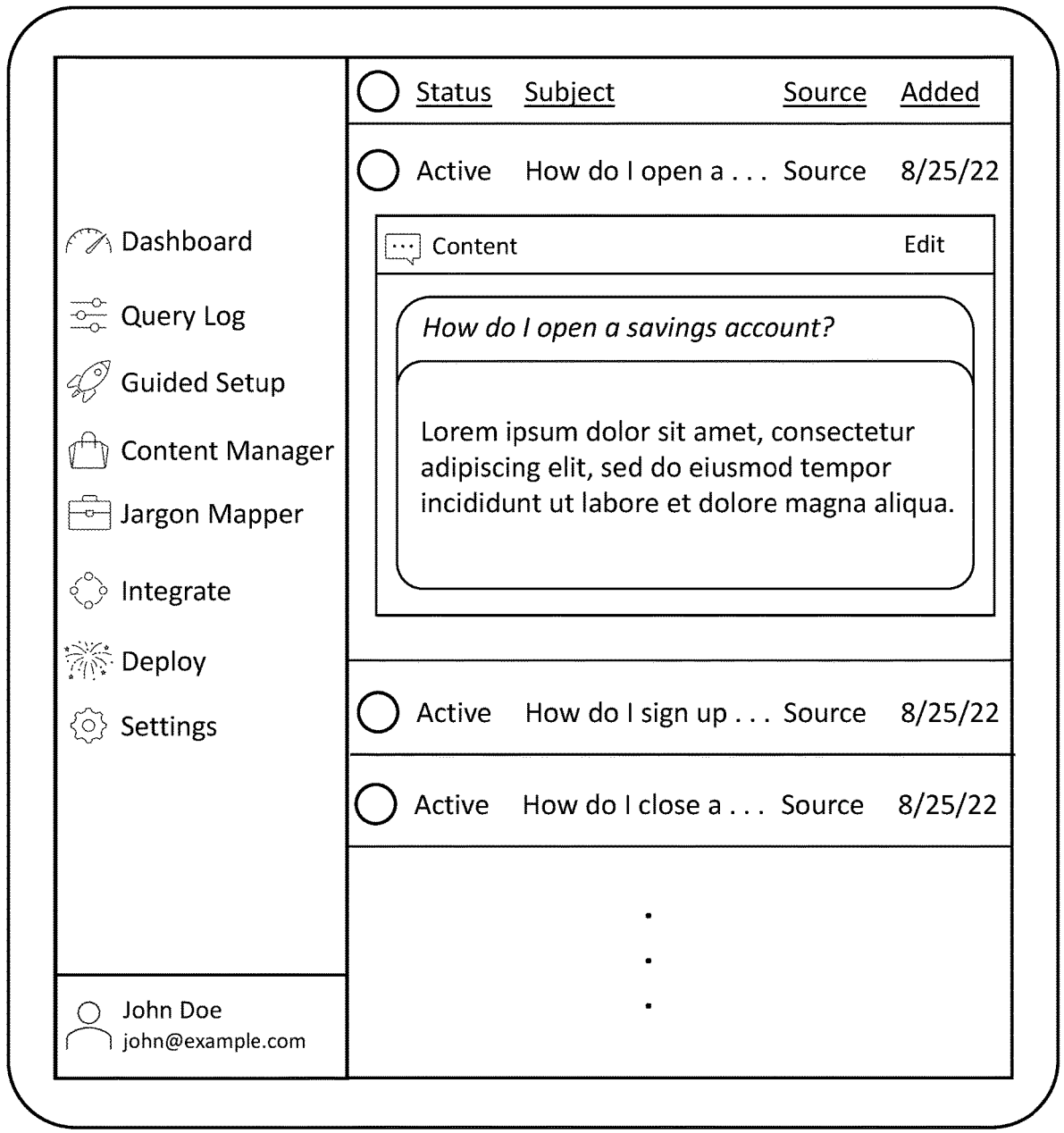
FIG. 3 illustrates an electronic device displaying a graphical representation of an utterance-response repository in accordance with one or more embodiments of the present application.

In some embodiments, each utterance-response entry stored in the utterance-response repository may correspond to a distinct utterance or query and/or may digitally house (e.g., store) one or more target responses (answers) related to the corresponding utterance or query. For instance, in a non-limiting example, one of the utterance-response entries stored in the utterance-response repository may correspond to the utterance or query "How do I open a savings account?" and, thus, may also include one or more target responses for that utterance/query (as generally illustrated in FIG. 3).

Identifying Knowledge Bases

In some embodiments, the utterance-response repository may be constructed based on (or in response to) S205 identifying one or more subscriber-defined data sources and/or knowledge bases. In one example of such embodiments, the utterance-response repository may be automatically constructed based on S205 identifying (or detecting) that a subscriber transmitted (or uploaded) one or more subscriber-defined knowledge bases to a system or service implementing the method 200. It shall be noted that a subscriber may transmit or upload the one or more subscriber-defined knowledge bases via any suitable method/manner, such as via one or more one or more graphical user interfaces, one or more command line interfaces, and/or one or more application programming interfaces (APIs) that are specifically configured to enable a subscriber to upload/transmit one or more knowledge bases to the system/service implementing the method 200.

In some embodiments, a subscriber-defined knowledge base may relate to one or more digital artifacts that store knowledge (e.g., facts, data, information, text, audio, media content, production logs, and/or the like) about one or more distinct topic areas/domains. For instance, in a non-limiting example, a knowledge base may comprise one or more frequently asked questions (FAQs), one or more instruction manuals, one or more step-by-step process guides, one or more websites, one or more blog posts, one or more video tutorials/demonstrations, one or more definitions (e.g., glossaries), one or more hierarchical documents, tabular data, call logs, Internet search data, and/or the like.

Identifying Potential Utterance or Queries

In some embodiments, based on identifying one or more subscriber-defined knowledge bases, S205 may, in turn, function to identify potential or likely utterances (or queries) existing within the one or more subscriber-defined knowledge bases. In one implementation, identifying potential utterances or queries existing within the one or more subscriber-defined knowledge bases may include searching the one or more subscriber-defined knowledge bases based on one or more utterance-detection heuristics, regular expressions, rules, and/or the like.

For instance, in a non-limiting example, based on searching the one or more subscriber-defined knowledge bases, S205 may function to identify each frequently asked question composed within the one or more subscriber-defined knowledge bases as a potential utterance/query. Similarly, in a second non-limiting example, based on searching the one or more subscriber-defined knowledge bases, S205 may function to recognize each sentence that ends in a question mark in the one or more subscriber-defined knowledge bases as a potential utterance/query. Additionally, or alternatively, in a third non-limiting example, S205 may function to determine potential utterances/queries existing in the one or more subscriber-defined knowledge bases based on applying a sentence segmentation algorithm to the one or more subscriber-defined knowledge bases.

It shall be noted that the above examples are not intended to be limiting and that based on the type of knowledge base identified by S205 (e.g., a video-based knowledge base, a text-based knowledge base, an audio-based knowledge base), S205 may function to search that knowledge base for potential queries/utterances with additional, fewer, or different utterance-detection heuristics than the ones described above.

Identifying Potential Responses/Answers

Furthermore, in some embodiments, S205 may function to identify one or more potential responses (answers) for each utterance/query identified by S205. In one implementation, to identify potential responses for each identified utterance/query, S205 may function to search the one or more subscriber-defined knowledge bases based on one or more utterance-to-answer pairing heuristics, regular expressions, rules, and/or the like.

For instance, in a non-limiting example, based on S205 identifying a respective potential utterance/query, S205, in turn, may function to search the one or more subscriber-defined knowledge bases for one or more potential responses/answers to the respective potential utterance/query. The one or more potential responses/answers identified for the respective potential utterance/query may include content (e.g., text, images, etc.) composed between the respective potential utterance/query and a next or subsequent potential utterance/query, content composed within a related document header (or sub-header), and/or the like. It shall be noted that S205 may function to derive potential responses/answers for all identified utterances/queries in analogous ways.

Furthermore, it shall also be noted that the above examples are not intended to be limiting and that based on the type of knowledge base identified by S205 (e.g., an FAQ-based knowledge base, a hierarchy-based knowledge base, a tabular-based knowledge base), S205 may function to search that respective knowledge base for potential responses/answers with additional, fewer, or different utterance-to-answer pairing heuristics than the ones described above.

Forming the Utterance-Response Repository

In some embodiments, S205 may function to create an utterance-response entry for each potential utterance identified by S205 and, in turn, add (e.g., embed) each created utterance-response entry to the utterance-response repository. In one example of such embodiments, creating an utterance-response entry for a target utterance may include instantiating a new utterance-response entry (e.g., a data structure suitable for storing data related to an utterance-response pair), may include annotating the newly instantiated utterance-response entry to include the target potential utterance, and/or may include annotating the newly instantiated utterance-response entry to include the potential answers/responses identified for the target potential utterance.

For instance, in a non-limiting example, if S205 identified "How do I open a Credit Card" as a potential utterance/query, S205, in turn, may function to instantiate a new utterance-response entry corresponding to that potential utterance/query, may function to embed the text "How do I open a Credit Card?" in the newly instantiated utterance-response entry, and/or may function to embed the identified potential responses to the utterance "How do I open a Credit Card?" in the newly instantiated utterance-response entry.

2.10 Generating a Slot Registry

S210, which includes generating a slot registry, may function to construct the slot registry based on utterances stored in the utterance-response repository. In some embodiments, the slot registry may comprise one or more data structures capable of storing slot tokens/values and, once generated, may store likely slot values associated with utterances stored in the utterance-response repository (instantiated in S205).

It shall be noted that a slot, as referred to herein, may generally relate to a classification label (e.g., entity label) associated with a distinct segment of an utterance or query. For instance, in a non-limiting example, the phrase "savings account" in the utterance/query "How do I open a savings account?" may relate to an "account type" slot. Similarly, it shall also be noted that, in some portions of the disclosure, the term slot value may refer to the value of a particular slot. For instance, the "account type" slot for the utterance/query "How do I open a savings account?" may have the value "savings account."

Identifying Slots

Figure 4:
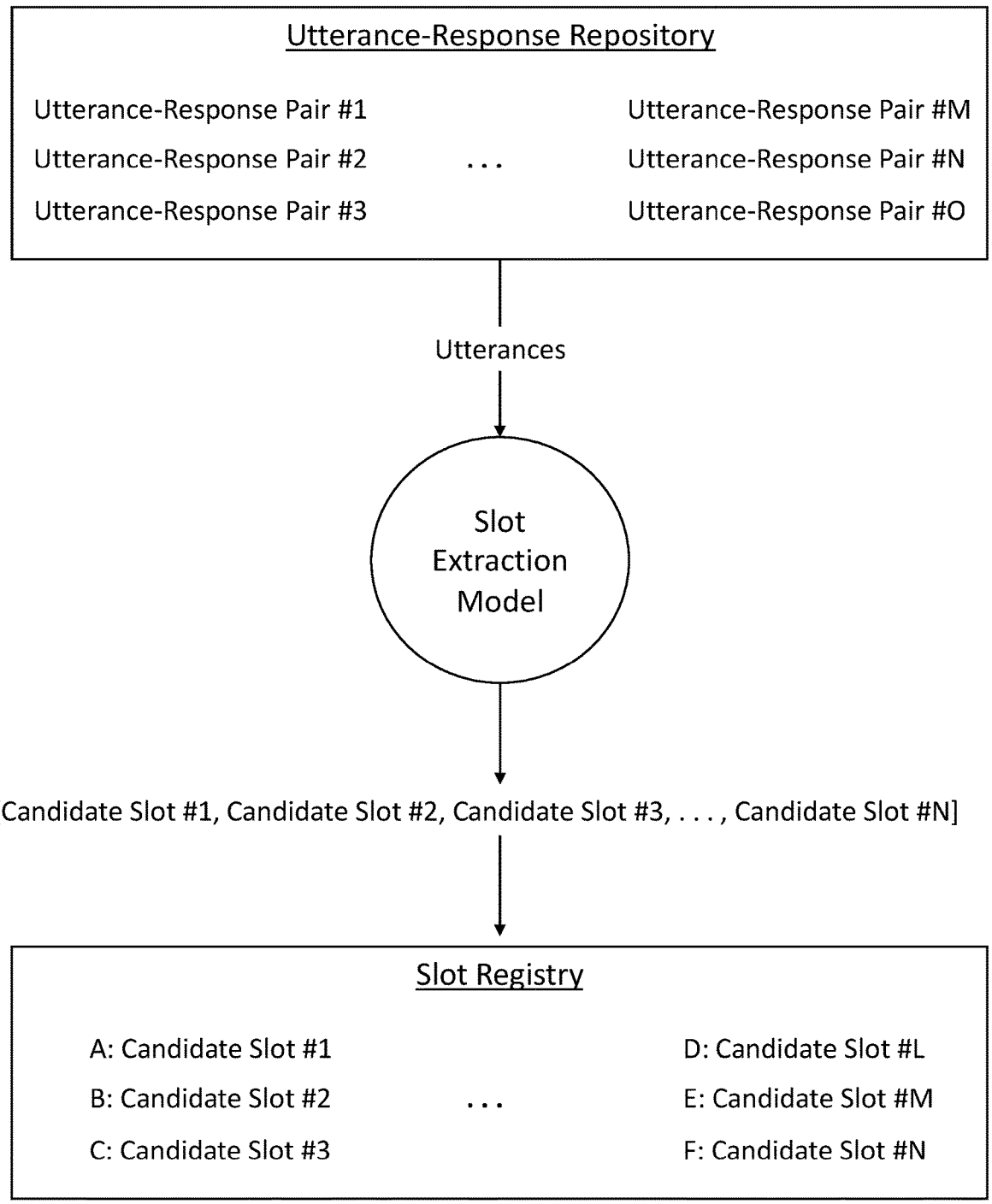
FIG. 4 illustrates an example schematic of generating a slot registry in accordance with one or more embodiments of the present application.

In some embodiments, as generally illustrated in FIG. 4, generating a slot registry may include identifying likely slot values associated with each utterance stored in the utterance-response repository. In one example of such embodiments, identifying the likely slot values may include obtaining (or collecting) the utterance/query underpinning each entry in the utterance-response repository and/or may include providing each obtained utterance/query as input into a slot value recognition machine learning model (e.g., an unsupervised machine learning model).

The slot value recognition machine learning model, in some embodiments, may comprise a trained part-of-speech tagging machine learning model, a trained named entity recognition machine learning model, and/or the like. Accordingly, in such embodiments, the slot value recognition machine learning model may be configured to receive a contiguous span of words (e.g., an utterance/query) as input and identify the likely slots (and/or slot values) associated with the contiguous span of words provided as output. It shall be noted that the term "unsupervised model" may refer to models that are not provided with any pre-defined labels or categories, but instead learn to identify patterns and structures within the data on their own. Thus, in the context of the disclosed technology, these unsupervised models may be tasked with identifying potential slots within the utterances.

Forming the Slot Registry

In some embodiments, for each identified slot (or slot value), S210 may function to construct a corresponding slot entry and/or may function to embed the corresponding slot entry in the slot registry (as generally illustrated in FIG. 4). In one implementation, constructing a slot entry for an identified slot value may include instantiating a new slot storing data structure, may include annotating the slot storing data structure to include the identified slot value (e.g., {savings accounts}), and/or may include digitally associating the identified slot value with a unique identifier (ID) (e.g., {X: savings accounts}).

2.20 Generating Skeleton Utterances

S220, which includes generating skeleton utterances, may function to generate a skeleton utterance for each utterance stored in the utterance-response repository (instantiated in S205). A skeleton utterance generated for a target utterance, as generally referred to herein, may be a compact, compressed, and/or generic representation of the target utterance (e.g., includes high level/noteworthy features about the target utterance and abstracts away lower-level features of the target utterance).

Masking Slot Values

In some embodiments, generating a skeleton utterance for each utterance stored in the utterance-response repository may include masking the slot values included in each of the utterances. In one example of such embodiments, masking the slot values included in a target utterance may include identifying which slot values/tokens (in the slot registry) exist in the target utterance.

In some embodiments, to identify which slot values/tokens exist in the target utterance, S220 may function to search the target utterance for each slot value/token existing in the slot registry. The search, once completed, may return a positive indication if S220 determines that the searched slot value(s)/token(s) exist in the target utterance or may return a negative indication if S220 determines that the searched slot value(s)/token(s) do not exist in the target utterance.

For instance, in a non-limiting example, if the slot registry includes—amongst other slot values—the slot values "checking account" and "savings account," S220 may function to search the target utterance for the terms "checking account" and "savings account." If the slot value "checking account" exists in the target utterance, S220 may return an indication that the slot value "checking account" exists in the target utterance. Similarly, if the slot value "savings account" exists in the target utterance, S220 may return an indication that the slot value "savings account" exists in the target utterance.

Figure 5:
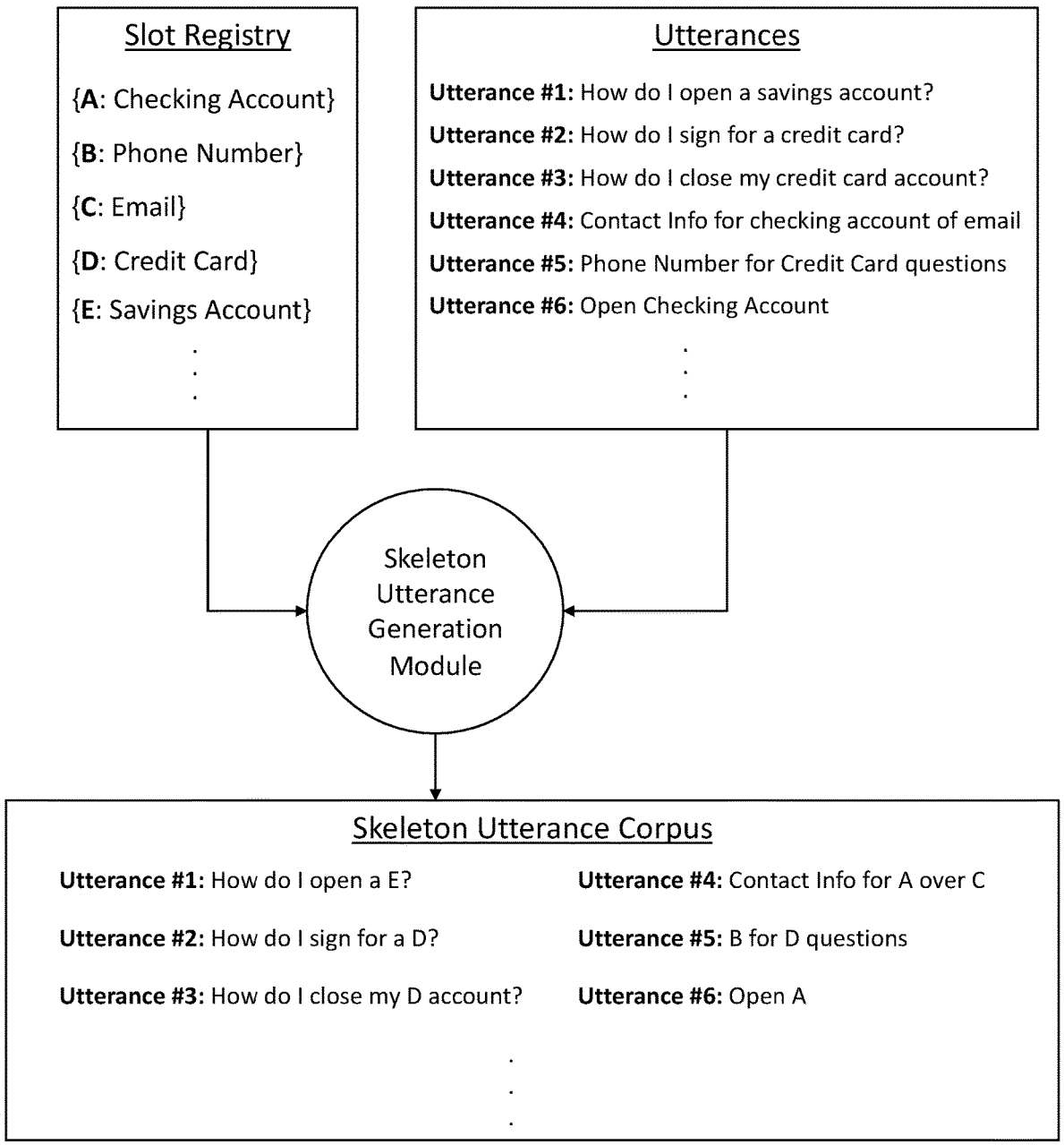
FIG. 5 illustrates an example schematic of generating skeleton utterances in accordance with one or more embodiments of the present application.

Additionally, or alternatively, in some embodiments, masking slot values associated with a target utterance may include replacing each slot value identified in the target utterance with a placeholder value (or a temporary variable), as generally illustrated in FIG. 5. In one example, the placeholder value that a slot value may be replaced with may correspond to the unique ID assigned to that slot value in the slot registry (e.g., so that the same slot values are (always) replaced with the same placeholder value).

For instance, in a non-limiting example, if S220 determines that the utterance "What is the phone number for credit card questions?" includes the slot values "phone number" and "credit card," S220 may function to replace the term "phone number" with the placeholder value 'X' and the term "credit card" with the placeholder value 'Y.' Thus, in such an example, the skeleton utterance corresponding to the utterance "What is the phone number for credit card questions?" may be "What is X for Y questions?".

Similarly, in a second non-limiting example, if S220 determined that the utterance "What is the contact information for credit card questions over email?" includes the slot values "credit card" and "email," S220 may function to replace the term "credit card" with the placeholder value 'Y' and the term "email" with the placeholder value 'W.' Thus, in such an example, the skeleton utterance corresponding to the utterance "What is the contact information for credit card questions over email?" may be "What is the contact information for Y questions over W?". It shall be noted that the above-described processes/techniques may be completed for each utterance stored in the utterance-response repository (described in S205).

Forming a Skeleton Utterance Corpus

In some embodiments, S220 may additionally, or alternatively, function to form a skeleton utterance corpus based on the generated skeleton utterances. In one example of such embodiments, forming the skeleton utterance corpus may include instantiating a data structure suitable for storing a plurality of skeleton utterances and/or may include adding each generated skeleton utterance to the suitable data structure.

It shall be noted that the above embodiments may provide numerous technical advantages including allowing for the comparison of utterances based on their high-level meaning or intent, rather than their specific details. In other words, by transforming the utterances into their skeleton form, the method may be able to compare and analyze utterances based on the structure and intent of the utterances, rather than the specific slot values that they contain.

For example, the skeleton utterances "How do I open a X?" and "What is the process to start a Y?" can be compared and analyzed based on their high-level intent of opening or starting something, without being influenced by the specific slot values such as "checking account" or "savings account". This may allow the method to identify and group together utterances that share similar intents, regardless of the specific slot values they contain.

2.30 Forming Distinct Skeleton Utterance Groups

Figure 6:
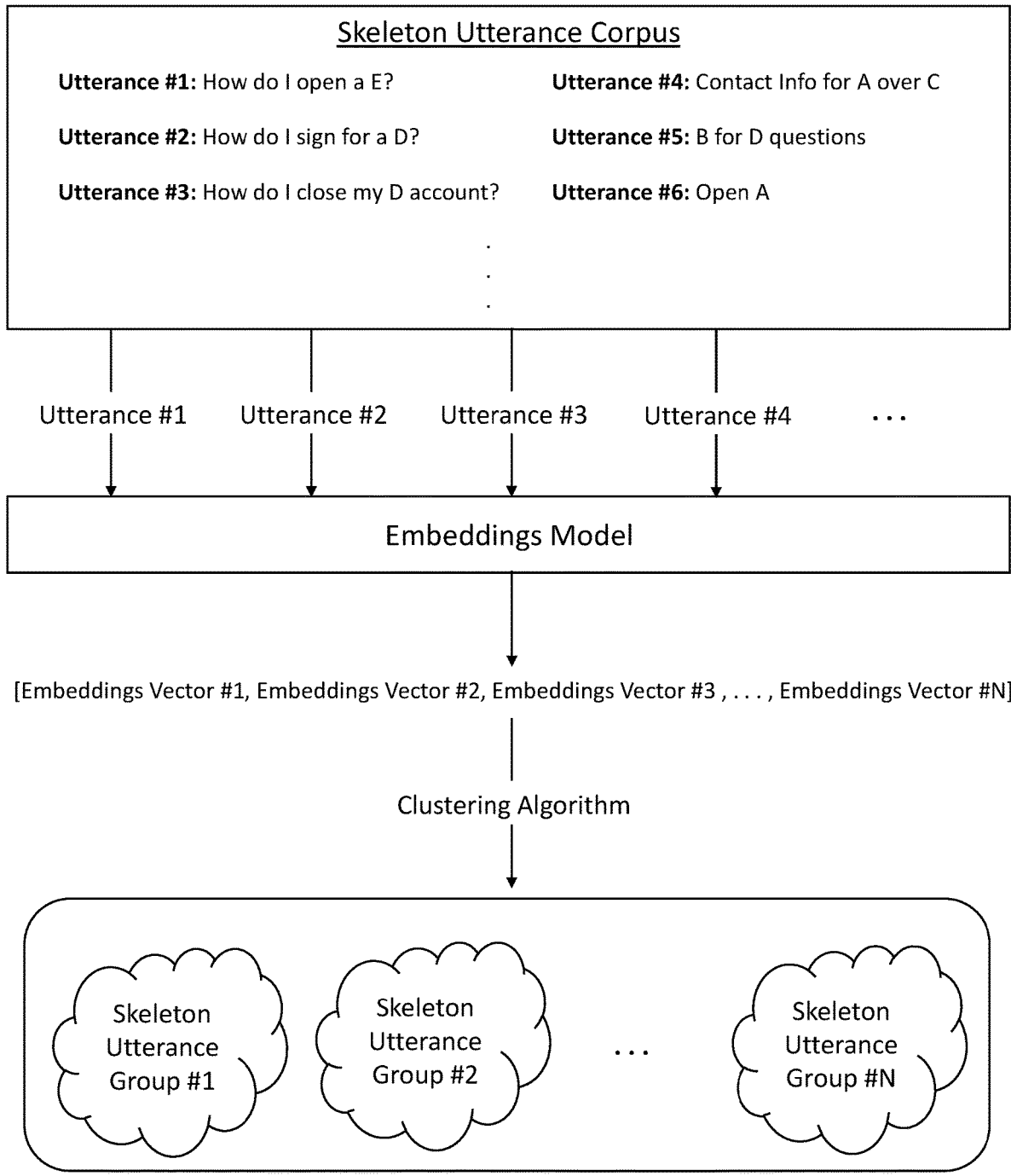
FIG. 6 illustrates an example schematic of generating a plurality of skeleton utterance groups in accordance with one or more embodiments of the present application.

S230, which includes forming distinct skeleton utterance groups, may function to stratify/partition a corpus of skeleton utterances into distinct skeleton utterance groups based on semantic similarity (as generally illustrated in FIG. 6). In some embodiments, as will be described in more detail herein, the distinct skeleton utterance groups formed by S230 may indicate slots that may be semantically similar to each other (e.g., indicate slot transition candidates). For instance, in a non-limiting example, if S230 formed a skeleton utterance group that includes, among others, the skeleton utterances "Open X account," "How do I open a Y account," and "How do I sign up for a Z account," S230 may function to identify that the slot values corresponding to the placeholder value X (e.g., checking account), Y (e.g., savings account), and Z (e.g., credit card) are potentially interchangeable (e.g., semantically similar).

In other words, in some examples, S230 may function to predict, based on a user asking a conversational dialogue agent "How do I open a savings account?", that the user may potentially follow-up with inquiries about related slot values, such as inquiring about opening a checking account (e.g., "What about a checking account?"), inquiring about opening a credit card account (e.g., "And for a credit card?"), and/or the like.

Computing Skeleton Utterance Embeddings

In some embodiments, forming distinct skeleton utterance groups may include computing an embeddings value of each skeleton utterance generated in S220. In one such example, computing an embeddings value of each skeleton utterance generated in S220 may include implementing an unsupervised language model (e.g., a transformer model, embeddings model, and/or the like) and/or may include providing each generated target skeleton utterance to the unsupervised language model as input. The unsupervised language model may then, in turn, process each provided target skeleton utterance and convert each provided target skeleton utterance to a vector value in an n-dimensional space. Accordingly, these numerical vector representations may capture the semantic features of the utterances, thus allowing for the comparison and grouping of semantically similar utterances.

Identifying Similar Skeleton Utterances

Additionally, or alternatively, in some embodiments forming distinct skeleton utterance groups may include identifying skeleton utterances that are similar to each other. In one implementation, identifying similar skeleton utterances may include clustering the skeleton utterances based on their corresponding embedding values. It shall be noted that, to cluster the skeleton utterances, S230 may function to implement any suitable clustering algorithm(s), such as a density-based clustering algorithm, a distribution-based clustering algorithm, a centroid-based clustering algorithm, and/or the like.

Accordingly, in such embodiments, the skeleton utterance groups ultimately formed by S230 may correspond to the clusters generated/produced by the selected clustering algorithm (e.g., each distinct skeleton utterance group formed by S230 (only) includes skeleton utterances that exist within the corresponding cluster). For instance, in a non-limiting example, if the clustering algorithm implemented by S230 formed, among others, a first cluster associated with a first plurality of skeleton utterances and a second cluster associated with a second plurality of skeleton utterances, S230 may, in turn, form a first distinct skeleton utterance group associated with the first cluster and a second distinct skeleton utterance group associated with the second cluster. Accordingly, in such an example, the first distinct skeleton utterance group may include the skeleton utterances associated with the first cluster (e.g., the first plurality of skeleton utterances) and the second distinct skeleton utterance group may include skeleton utterances associated with the second cluster (e.g., the second plurality of skeleton utterances).

2.40 Identifying Valid Slot Transition Pairs

S240, which includes identifying valid slot transition pairs, may function to identify candidate slot transition pairs existing in each of the distinct skeleton utterance groups formed in S230 and, in turn, may evaluate the validity of each identified candidate slot transition pair. A valid slot transition pair, as generally referred to herein, may relate to a pair of slots (or slot values) that may be realistically interchanged (e.g., switched between) during a natural conversation with a dialogue agent. For instance, in a non-limiting example, S240 may determine that a slot transition pair comprising email and phone number may be a valid slot transition pair if S240 determines that a detected email slot may replace a phone number slot (or vice versa) during a user's dialogue with a conversational agent.

It shall be noted that, for detecting slots and changes in slots during a dialogue session, one or more of the methods/techniques described in U.S. Provisional Application No. 63/305,366 and/or U.S. Provisional Application No. 63/335,832 may be implemented by the method 200—both of which are incorporated in their entireties by this reference.

Identifying Potential Slot Transition Pairs

In some embodiments, identifying valid slot transition pairs may include identifying/enumerating the potential slot transition pairs associated with each distinct skeleton utterance group formed in S230. In one example of such embodiments, enumerating the slots transition pairs associated with a target skeleton utterance group may include identifying all the slot values (or slots) associated with the target skeleton utterance group and/or may include deriving, based on the identified slot values, a slot transition pair corresponding to each (possible) permutation.

For instance, in a non-limiting example, if a target skeleton utterance group includes the skeleton utterances "What is the contact information for X questions over Y," "What is the W for Z questions," and "A for B questions" (among others), S240 may identify that the target skeleton utterance group includes the slots values X, Y, W, Z, A, and B and, thus, may identify X-Y, X-W, X-Z, X-A, X-B as potential slot transition pairs (among the other possible permutations).

Identifying Corresponding Skeleton Utterances

In some embodiments, identifying valid slot transition pairs may additionally, or alternatively, include identifying the skeleton utterances associated with each detected slot transition pair. For instance, in a non-limiting example, upon identifying a slot transition pair comprising the slot values {X, Z}, S240 may function to search the distinct skeleton utterance groups for skeleton utterances that include the placeholder slot value X and/or Z. In such an example and based on the searching, S240 may function to identify that the skeleton utterances "Contact info for X over Y" and "W for Z questions" (among others) relate to the slot transition pair {X, Z}.

Similarly, in a second non-limiting example, upon identifying the slot transition pair comprising the slot values {X, Y}, S240 may function to search the distinct skeleton utterance groups for skeleton utterances that include the placeholder slot value X and/or Y. In such an example and based on the searching, S240 may function to identify that the skeleton utterances "Open X account" and "How do I open a Y account" (among others) relate to the slot transition pair {X, Y}.

Installing Slot Values in the Skeleton Utterances

In some embodiments, S240 may function to create multiple (distinct) instances of each skeleton utterance determined to be associated with a target slot transition pair. In one example of such embodiments, creating multiple distinct instances of a target skeleton utterance may include generating a distinct instance of the target skeleton utterance based on each slot (or slot value) comprising a target slot transition pair.

In some embodiments, generating multiple distinct instances of a target skeleton utterance may include generating a first distinct instance of the target skeleton utterance such that the slot placeholder value(s) included in the skeleton utterance are replaced with their corresponding slot value(s). For instance, in a non-limiting example, based on S240 identifying that the skeleton utterances "Contact info for X over Y" and/or "W for Z questions" (among others) are associated with the slot transition pair {X,Z}, S240 may function to install the slot values associated with 'X' (e.g., checking account) and 'Z' (e.g., credit card) at corresponding portions in the skeleton utterances (e.g., "Contact info for checking account over Y," "W for credit card questions," etc.).

Additionally, or alternatively, in some embodiments, generating multiple instances of a target skeleton utterance may include generating a second distinct instance of the target skeleton utterance such that (at least a portion of) the slot placeholder values(s) included in the skeleton utterance are interchanged. For instance, in a non-limiting example, based on S240 identifying that the skeleton utterances "Contact info for X over Y" and/or "W for Z questions" (among others) are associated with the slot transition pair {X,Z}, S240 may function to install the slot value associated with 'X' (e.g., checking account) at portions in the skeleton utterances corresponding to the slot value 'Z' and may install the slot value associated with 'Z' (e.g., credit card) at portions in the skeleton utterances corresponding to the slot value 'X' (e.g., "Contact info for credit card over Y," "W for checking account questions," etc.).

It shall be noted that the above processes may be similarly performed for each potential slot transition pair identified by S240 and/or may be similarly performed for each skeleton utterance determined to be associated with a target slot transition pair. Furthermore, it shall also be noted that, in some embodiments, only placeholder slot values that are associated with a target slot transition pair may be replaced in the skeleton utterances—as illustrated in the above examples.

Computing a Slot Exchange Score

In some embodiments, identifying valid slot transition pairs may additionally, or alternatively, include computing a slot exchange score for each potential slot transition pair. In one example of such embodiments, computing the slot exchange score for a target slot transition pair may include identifying the skeleton utterances generated for the target slot transition pair (e.g., the instances of skeleton utterances that include installed slot values). For instance, in a non-limiting example, for a target slot transition pair comprising the slot values "checking account" and "credit card," S240 may function to identify instances of the skeleton utterances that contain the slot value "checking account" (e.g., "Contact info for checking accounts over Y," "W for checking account questions," and/or the like) and/or identify instances of the skeleton utterances that contain the slot value "credit card" (e.g., "Contact info for credit card over Y," "W for credit card questions," and/or the like).

Furthermore, in some embodiments, computing the slot exchange score for a target slot transition pair may include computing, via a language model or the like, an embeddings representation of each skeleton utterance instance associated with the target slot transition pair and/or may include computing a similarity score between such embeddings representations (e.g., an absolute difference between the embeddings representations (or the like)). For instance, in a non-limiting example, for a target slot transition pair comprising the slot values "checking account" and "credit card," S240 may function to compute an embeddings representation of each skeleton utterance that includes the checking account slot value and/or the credit card slot value and, in turn, compute the (absolute) difference in embedding values amongst these embeddings representations ("slot exchange score").

Identifying Valid Slot Transition Pairs

In some embodiments, S240 may additionally, or alternatively, function to determine which of the potential slot transition pairs are valid. In one example, to determine which of the potential slot transition pairs are valid, S240 may function to assess the slot exchange score computed for each potential slot transition pair against a baseline slot exchange score. In such an example, if the slot exchange score computed for a target slot transition pair indicates a higher similarity than the baseline slot exchange score, S240 may function to determine that the target slot transition pair is valid. Otherwise, in some embodiments, if the slot exchange score computed for a target slot transition pair indicates an equivalent (or lesser) similarity than the baseline slot exchange score, S240 may function to determine that the target slot transition pair is not valid.

It shall be noted that, in some embodiments, the baseline slot exchange score may indicate the similarity of the skeleton utterances under evaluation without any slot values installed (e.g., the skeleton utterances only include placeholder slot values) and may be computed in one or more similar ways described above.

It shall also be noted that, in some embodiments, the processes of S240 may be described as performing a pairwise analysis of potentially interchangeable slot values within the skeleton utterance groups. In some embodiments, the goal of this analysis is to identify pairs of slots that can be interchanged within the context of a given utterance, thereby enabling the identification of valid transitions between different content pieces. Additional and/or alternative embodiments of the pairwise analysis will now be described.

In some embodiments, the pairwise analysis begins by identifying all possible pairs of slots within a given skeleton utterance group. For instance, if a skeleton utterance group contains the slots "checking account", "savings account", and "credit card account", the method may identify the pairs ("checking account", "savings account"), ("checking account", "credit card account"), and ("savings account", "credit card account") as potential slot transition pairs.

In some embodiments, once the potential slot transition pairs have been identified, the method may proceed to assess the validity of these pairs. This assessment may be based on a comparison of the semantic similarity scores of the skeleton utterances associated with the slots in the pair. For instance, if the pair under consideration is ("checking account", "savings account"), the method may compare the semantic similarity scores of the skeleton utterances "How do I open a X?" and "What is the process to start a X?", where X is replaced with "checking account" and "savings account" respectively.

If the semantic similarity scores of the skeleton utterances associated with the slots in the pair are found to be sufficiently high, the pair is deemed to be a valid slot transition pair. This indicates that the slots in the pair can be interchanged within the context of the given utterance, thereby enabling a valid transition between different content pieces. Conversely, if the semantic similarity scores are not sufficiently high, the pair is deemed to be an invalid slot transition pair and is not considered for further analysis. Accordingly, through this process of pairwise analysis of potentially interchangeable slot values, the method may be able to identify valid slot transition pairs.

2.45 Constructing Distinct Slot Ontology Groups

S245, which includes constructing distinct slot ontology groups, may function to construct one or more distinct slot ontology groups based on the slot transition pairs identified as valid in S240. In some embodiments, a slot ontology group, as generally referred to herein, may relate to a collection/group of slots (or slot values) that are associated with a same topic area (e.g., domain or entity) and, thus, semantically similar to each other.

In some embodiments, constructing the distinct slot ontology groups may include (iteratively) building the distinct slot ontology groups while iterating through the valid slot transition pairs. In one example of such embodiments, at each iteration, S240 may function to evaluate/assess the slot transition pair associated with the current iteration and, based on the assessment, form/create a new distinct slot ontology group that includes the slot values of the subject slot transition pair or append the slot values of the subject slot transition pair to an existing slot ontology group related to these slot values.

In some embodiments, evaluating/assessing the slot transition pair associated with a current iteration may include evaluating the slot transition pair based on transitive properties. For instance, in a non-limiting example, if S240 has formed—among others—a first slot ontology group comprising [checking account, . . . , savings account] and a second slot ontology group comprising [phone number, . . . , email] while evaluating the slot transition pair {savings account, credit card}, S240 may function to add the slot value 'credit card' to the first slot ontology group because of transitive properties (e.g., because both the slot transition pair and the first slot ontology group are associated with the 'savings account' slot value).

Similarly, in a second non-limiting example, if S240 has formed—among others—a first slot ontology group comprising [checking account, . . . , credit card, savings account] while evaluating the slot transition pair {phone number, email}, S240 may function to form a new slot ontology group comprising the slot values phone number and email (e.g., because neither slot values are associated with the first slot ontology group by transitive principles).

It shall be noted that one or more of the above-described processes may be similarly performed for each slot transition pair identified while iterating through the valid slot transition pairs.

Additionally, or alternatively, in some embodiments, the process of deriving slot ontology groups may begin by iterating through the identified valid slot transition pairs. At every iteration, the method may determine if the slot values associated with the current slot transition pair are transitively related to slot values in one or more existing slot ontology groups. This determination, in some embodiments, may be based on a search for a transitive relationship between the slot values associated with the current slot transition pair and the slot values in the existing slot ontology groups.

In some embodiments, if the method determines that the slot values associated with the current slot transition pair are transitively related to slot values in an existing slot ontology group, the method may add the slot values associated with the current slot transition pair to the existing slot ontology group. On the other hand, if the method determines that the slot values associated with the current slot transition pair are not transitively related to the slot values within the existing slot ontology groups, the method may form a new slot ontology group and incorporate the slot values associated with the current slot transition pair into the new slot ontology group.

Thus, through this process, the method may be able to derive a set of distinct slot ontology groups based on the identified valid slot transition pairs. Each slot ontology group may represent a set of interchangeable slot values that can be used in transitions within a conversational system.

2.50 Automatically Configuring a Virtual Dialogue System

S250, which includes automatically configuring a virtual dialogue system, may function to configure (e.g., without user input) the virtual dialogue system to automatically handle/process user queries or utterances based on the outcomes/results of S205-S245. In some embodiments, the virtual dialogue system, once configured by S250, may function to automatically handle/process a variety of queries including contextless queries, contextful queries, and/or the like.

A contextless query, as generally referred to herein, may relate to a user query or utterance that does not semantically relate to a (e.g., immediately) preceding user query or utterance received by the virtual dialogue system. For instance, in a non-limiting example, if the virtual dialogue system receives the query "What rewards are there for credit cards?" after receiving/processing the query "What is a brokerage account?", S250 may function to determine that the new query received by the virtual dialogue system relates to a contextless query since processing the new query does not depend on the query "What is a brokerage account?". It shall be noted the virtual dialogue system may detect a contextless query and process the contextless query based on one or more methods/techniques described in U.S. Provisional Application No. 63/305,366 and/or U.S. Provisional Application No. 63/335,832, which are incorporated in their entireties by this reference.

Conversely, a contextful query, as generally referred to herein, may relate to a user query or utterance that semantically relates to a (e.g., immediately) preceding user query or utterance received by the virtual dialogue system (e.g., relates to/shares the same slot value and/or intent of the preceding user query). For instance, in a non-limiting example, if the virtual dialogue system receives the query "How do I open one?" after receiving/processing the query "What is a brokerage account?", S250 may function to determine that the new query received by the virtual dialogue system relates to a contextful query since processing the new query depends on the slot(s) and/or intent(s) detected for "What is a brokerage account?". It shall be noted the virtual dialogue system may detect a contextful query, the slot(s) relating to the contextful query, and/or the intent(s) relating to the contextful query based on one or more methods/techniques described in U.S. Provisional Application No. 63/305,366 and/or U.S. Provisional Application No. 63/335,832.

Handling a Contextful Query|Detecting Slot Transitions

Figure 7:
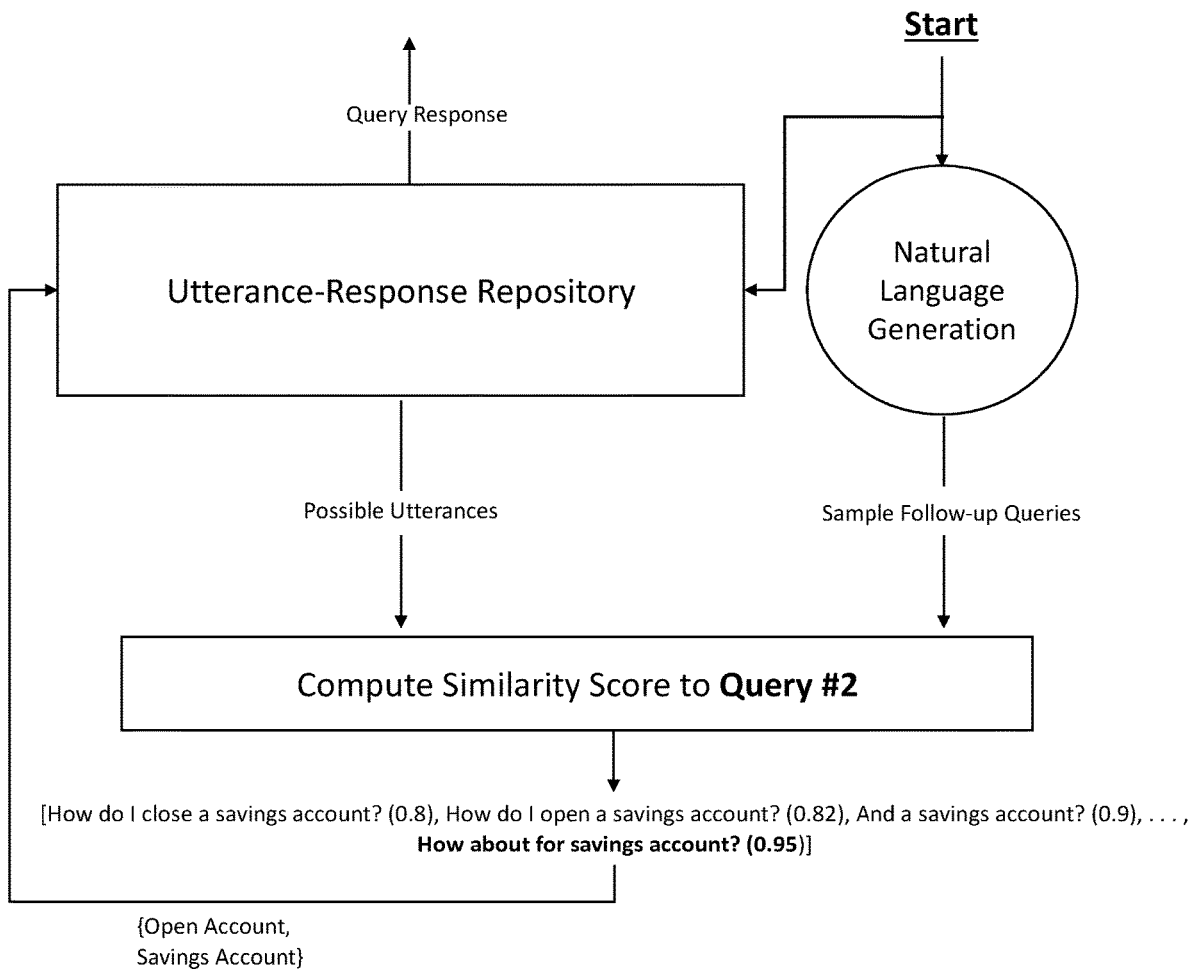
FIG. 7 illustrates a first implementation of generating a response to a user query in accordance with one or more embodiments of the present application.

As generally illustrated in FIG. 7, in one implementation, handling/processing a contextful query may include identifying if the contextful query includes one or more slot values. In one example of such embodiments, to identify slot values associated with a contextful query, S250 may function to implement one or more the techniques/methods described in U.S. Provisional Application No. 63/305,366 and/or U.S. Provisional Application No. 63/335,832. For instance, in a non-limiting example, if the virtual dialogue system receives the query "What about a savings account?", S250 may function to recognize that the received query includes the slot value "savings account."

In some embodiments, the detected slot value(s) may be compared to the most recently (or currently) detected slot value(s) of the virtual dialogue system to determine if the newly detected slot values exist in the same slot ontology group as the most recently detected slot value(s). If a positive determination is made, S250 may, in turn, perform one or more of the below described processes. Otherwise, in some embodiments, if a negative determination is made, S250 may function to perform one or more of the processes described with respect to the second implementation of handling a contextful query ("detecting changes in query intent") and/or may generate a default response to the received query, such as "I'm sorry, but I don't understand your question.", "I'm unable to process your query. Please try again.", and/or the like.

Furthermore, in some embodiments, handling/processing a contextful query may additionally, or alternatively, include generating one or more prefabricated follow-up type questions for the recognized/detected slot value(s). For instance, in a non-limiting example, based on the virtual dialogue system receiving the query "What about a savings account?", S250 may function to generate, via a language model (language heuristics, etc.), one or more follow-up type questions using the slot value associated with the received query (e.g., savings account), such as "And a savings account?", "How about for savings account?", "How about for a savings account?", and/or the like.

Additionally, or alternatively, in some embodiments, handling/processing a contextful query may additionally, or alternatively, include computing a semantic similarity (confidence) score between the contextful query and the utterances associated with the detected slot value. In some embodiments, utterances that may be associated with the detected slot value may include the one or more generated follow-up type questions and/or may include the utterances in the utterance-response repository and/or the skeleton utterances that correspond to the slot value(s) detected in the contextful query.

For instance, in a non-limiting example, based on the virtual dialogue system receiving the query "What about a savings account?" and identifying that the query corresponds to the slot value "savings account," S250 may function to compute a semantic similarity score of each generated utterance follow-up type questions (e.g., "And a savings account?", "How about for savings account?", etc.) and/or compute a semantic similarity score for each utterance associated with the "savings account" slot value in the utterance-response repository (e.g., "How do I close a savings account," "How do I open a savings account," and/or the like).

In such embodiments, if S250 determines that one of the evaluated utterance follow-up type questions is most similar (e.g., closest) to the received contextful query, S250 may, in turn, identify that the slot values associated with the received contextful query relates to the currently detected (e.g., most recently identified) topic area of the virtual dialogue system. For instance, in a non-limiting example, if the virtual dialogue system received a first query "How do I open a checking account?" before receiving a second query "What about a savings account?" and also identified that the first query relates to the topic area "opening accounts," S250 may, in turn, function to identify that the second query received by the virtual dialogue system relates to the same topic area of the first query (e.g., "opening accounts") if one of the generated utterance follow-up type questions is determined to be most similar (e.g., closest) to the received contextful query.

Additionally, or alternatively, in some embodiments, handling/processing a contextful query may include generating a response to the received contextful query. In one example of such embodiments, generating a response to the received contextful query may include querying for an utterance, in the utterance-response repository, that matches the detected topic area of the contextful query and the slot value(s) associated with the contextful query and/or may include generating a response to the contextful query based on a response paired to the utterance returned from the query. For instance, in a non-limiting example, based on identifying that the contextful query "What about a savings account?" relates to the topic area "opening accounts" and the slot value "savings account," S250 may function to query the utterance-response repository for an utterance corresponding to the identified topic area and slot values of the query (e.g., "How do I open a savings account?") and, in turn, may generate a response to the contextful query based on the answer paired to the utterance returned from the query.

In other words, when a user utterance is received, the method may first identify the likely dialogue intent of the utterance and extract the relevant slots. It may then use the derived slot ontology groups to identify potential transitions that are contextually relevant to the user's utterance. This is achieved by comparing the slots extracted from the user's utterance with the slots contained within the slot ontology groups. If a match is found, the system may identify the slots associated with the matched slot ontology group as potential slot transitions.

For instance, if the user's utterance is "How do I open a checking account?" and then follows up with "What about a savings account?", the method may recognize that the user's intent has transitioned from opening a checking account to opening a savings account. To facilitate this transition, the system may generate potential candidate utterances for the follow-up question "What about a savings account?" based on the slot ontology group associated with the preceding utterance "How do I open a checking account?". These candidate utterances might include "How do I open a savings account?", "What is the process to start a savings account?", and so on.

The method may then compute the classification scores for these candidate utterances using a classification model. This model may be trained to assign a confidence score to a given utterance based on its semantic similarity to the generic utterances and the slot values in the slot groups. The higher the confidence score, the more likely it is to relate to the user utterance or the like.

Handling a Contextful Query|Detecting Intent Transitions

Figure 8:
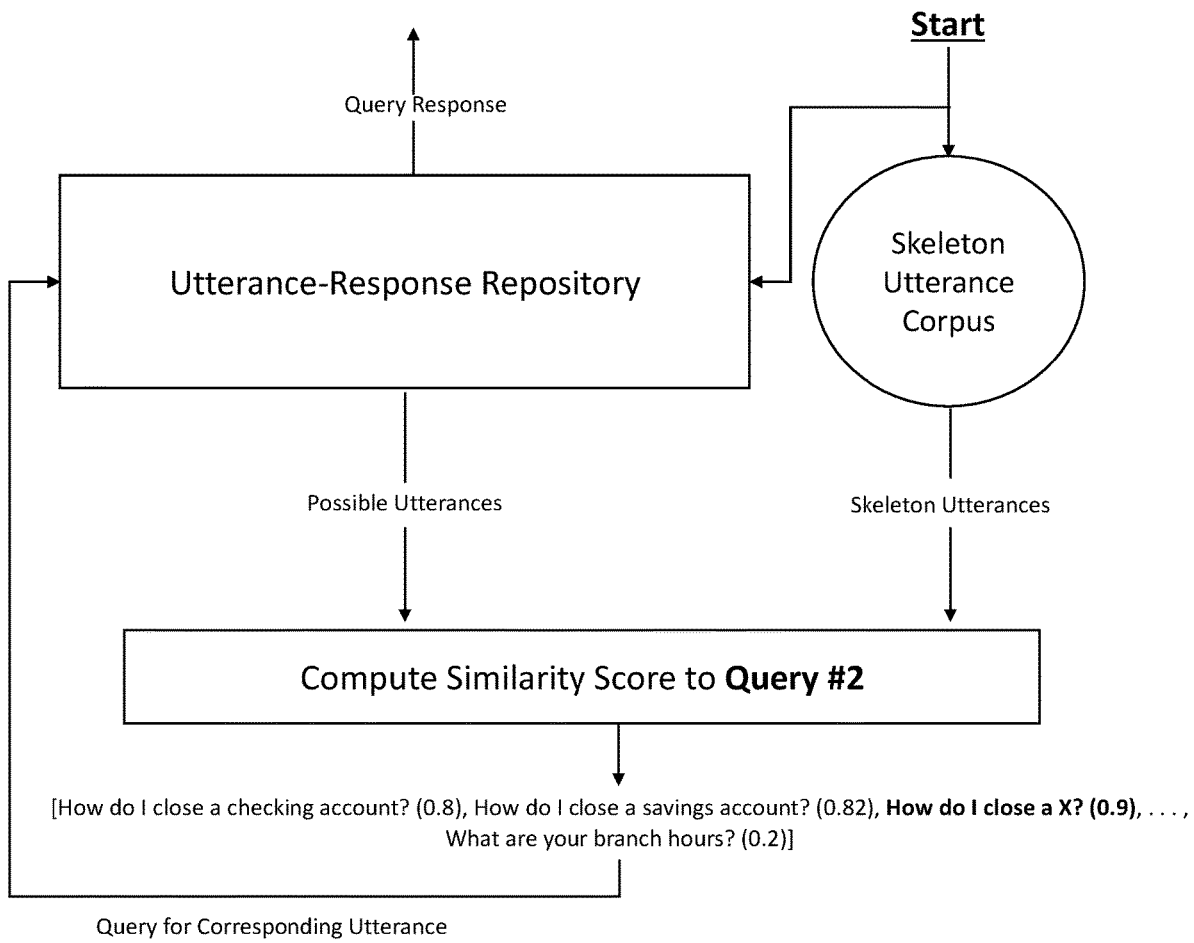
FIG. 8 illustrates a second implementation of generating a response to a user query in accordance with one or more embodiments of the present application.

As generally illustrated in FIG. 8, in a second implementation, handling/processing a contextful query may include identifying (all) possible utterances related to the contextful query. In one example of such implementations, the utterances related to the contextful query may include (e.g., all) the utterances stored in the utterance-response repository, the skeleton utterances generated in S230, and/or the like. For instance, in a non-limiting example, based on the virtual dialogue system receiving the query "How do I close one?", S250 may function to collect the queries or utterances stored in the utterance-response repository (e.g., "How do I close a checking account?", "How do I open a savings account?", "What are your branch hours?", and/or the like) and/or may function to collect the skeleton utterances generated in S240 (e.g., "How do I close an X?", "How do I open an X?", and/or the like).

In a variation of such an example, S250 may function to only identify skeleton utterances (and/or utterances in the utterance-response repository) that relate to the current slot value(s) detected by the virtual dialogue system. For instance, in a non-limiting example, if the virtual dialogue system received a first query "How do I open a checking account?" before receiving a second query "How do I close one?" and identified that the first query includes a "checking account" slot value, S250 may function to only identify skeleton utterances that include a placeholder slot value corresponding to the "checking account" slot value and/or may function to only identify utterances in the utterance-response repository that include the "checking account" slot value.

Additionally, or alternatively, in some embodiments, handling/processing a contextful query may include computing a semantic similarity score between the contextful query and each identified utterance (as described above). For instance, in a non-limiting example, if S250 identified a first utterance (e.g., "What are your branch hours?"), a second utterance (e.g., "How do I close a checking account?"), a third utterance (e.g., "How do I close a savings account?"), a fourth utterance (e.g., "How do I close a X?"), a fifth utterance (e.g., "How do I open a X?") and/or the like based on receiving a contextful query, S250 may, in turn, compute a semantic similarity score between the contextful query and each of the first, second, third, fourth, fifth, etc. utterances.

In some embodiments, if S250 determines that one of the identified skeleton utterances is determined to be most similar to the received contextful query, S250 may, in turn, identify an utterance in the utterance-response repository that maps to the identified skeleton utterance (e.g., the utterance from which the identified skeleton utterance was derived) and/or may generate a response to the contextful query based on the answer/response associated with the utterance that maps to the identified skeleton utterance. For instance, in a non-limiting example, if S250 identified that "How do I close a X" has the highest semantic similarity to the contextful query "How do I close one?" and identified that "How do I close a X?" was derived from the utterance "How do I close a savings account?", S250 may, in turn, generate a response to the contextful query based on the answer/response paired to the "How do I close a savings account?" in the utterance-response repository.

In other words, in some embodiments, when a user interacts with the conversational system, the method may function to identify the likely dialogue intent of the user's utterance and extract the relevant slots from the utterance. The method may then use the derived slot ontology groups to identify potential intent transitions that are contextually relevant to the user's utterance. This may be achieved by comparing the slots extracted from the user's utterance with the slots contained within the slot ontology groups. If a match is found, the method may identify the corresponding skeleton utterance associated with the matched slot ontology group as a potential transition.

For instance, if the user's utterance is "How do I open a checking account?", and "checking account" is identified as a slot, the method may search the slot ontology groups for a group that contains "checking account". If such a group is found, the method may then identify the skeleton utterance associated with this group, such as "How do I open a X?", as a potential transition (among others).

In some embodiments, in addition to identifying potential transitions, the method may also generate responses to subsequent user utterances received from the user. This may be achieved by comparing the classification scores of the potential transitions with the classification scores of the subsequent user utterances. If a match is found, the method may generate a response based on the matched transition. Accordingly, this process may allow the system to generate contextually relevant responses to the user's utterances, thereby facilitating a seamless conversational experience.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

I claim:

1. A method for enhancing predictive dialogue inferences of a machine learning-based automated dialogue system, the method comprising:
at a remote machine learning-based automated dialogue service:
sourcing, into a dedicated knowledge database, a corpus of utterance data of a subscriber to the remote machine learning-based automated dialogue service, the corpus of utterance data comprising a plurality of utterances;
identifying, by a slot extraction machine learning model executed by one or more computers, a set of one or more slot values within each of the plurality of utterances;
converting, by the one or more computers, the plurality of utterances to a plurality of skeleton utterances by masking the set of one or more slot values identified within each of the plurality of utterances, wherein masking the set of one or more slot values includes replacing each identified slot value of the set of one or more slot values with a random slot variable;
grouping, by the one or more computers, the plurality of skeleton utterances into a plurality of skeleton utterance groups based on embedding values of the plurality of skeleton utterances;
identifying, by the one or more computers, a plurality of valid slot transition pairs based on a pairwise analysis of potentially interchangeable slot values;
deriving, by the one or more computers, a plurality of slot ontology groups based on the plurality of valid slot transition pairs, wherein deriving the plurality of slot ontology groups includes:
iterating through each of the plurality of valid slot transition pairs, and
at each iteration:
determining, by the one or more computers, if slot values associated with a current slot transition pair are transitively related to slot values in one or more existing slot ontology groups,
adding, by the one or more computers, the slot values associated with the current slot transition pair to an existing slot ontology group when the slot values associated with the current slot transition pair are determined to be transitively related to slot values in the existing slot ontology group, and
forming, by the one or more computers, a new slot ontology group and incorporating the slot values associated with the current slot transition pair into the new slot ontology group when the slot values associated with the current slot transition pair are determined to not be transitively related to the slot values within the one or more existing slot ontology groups;
using, by the one or more computers, the plurality of slot ontology groups and the plurality of skeleton utterances to configure the dedicated knowledge database, wherein configuring the dedicated knowledge database includes:
automatically encoding the dedicated knowledge database with a plurality of metadata transition values between distinct pairs of utterances of the plurality of utterances that digitally associates each of the distinct pairs of utterances as likely transitions in a given dialogue session between a user and an automated dialogue system operated by the machine learning-based automated dialogue service based on the plurality of slot ontology groups; and
once encoded, implementing the dedicated knowledge database in a production environment that enables an execution of the automated dialogue system in a plurality of automated conversations using the plurality of metadata transition values of the dedicated knowledge base to automatically predict transitionary responses based on user utterances in multi-turn conversations that likely include a change in dialogue intents.

2. The method according to claim 1, wherein determining if the slot values associated with the current slot transition pair are transitively related to the slot values in one or more existing slot ontology groups includes:
searching, by the one or more computers, for a transitive relationship between the slot values associated with the current slot transition pair and the slot values in a respective existing slot ontology group,
confirming, by the one or computers, that the slot values associated with the current slot transition pair are transitively related to the slot values in the respective existing slot ontology group based on an existence of the transitive relationship, and
disconfirming, by the one or computers, that the slot values associated with the current slot transition pair are transitively related to the slot values in the respective existing slot ontology group based on an absence of the transitive relationship.

3. The method according to claim 1, wherein:
the automated dialogue system is configured to (i) compute a likely dialogue intent for each user utterance received from the user and (ii) extract slot values from each user utterance received from the user, and
using the plurality of slot ontology groups to generate a response to a subsequent user utterance received from the user includes:
identifying, by the one or more computers, the likely dialogue intent of a user utterance preceding the subsequent user utterance,
generating, by the one or more computers, a plurality of semantic follow-up candidate utterances based on one or more slot ontology groups associated with the user utterance preceding the subsequent user utterance,
computing, by the one or more computers, a plurality of classification scores for each of the plurality of semantic follow-up candidate utterances, the plurality of utterances, and at least a subset of the plurality of skeleton utterances, and
generating, by the one or more computers, a response to the subsequent user utterance based on a highest classification score among the plurality of classification scores.

4. The method according to claim 3, wherein when a classification score corresponding to a respective one of the plurality of semantic follow-up candidate utterances scores highest amongst the plurality of classification scores, generating the response to the subsequent user utterance includes:
generating the response based on the likely dialogue intent of the user utterance preceding the subsequent user utterance and a slot associated with the respective one of the plurality of semantic follow-up candidate utterances.

5. The method according to claim 3, wherein:
the user utterance preceding the subsequent user utterance includes a first slot related to a first distinct slot ontology group,
the first distinct slot ontology group comprises the first slot and one or more other slot values, and
generating, by the one or more computers, the plurality of semantic follow-up candidate utterances includes generating a semantic follow-up candidate utterance for each of the other slot values in the first distinct slot ontology group.

6. The method according to claim 3, wherein when a classification score corresponding to a respective one of the plurality of skeleton utterances scores highest amongst the plurality of classification scores, generating the response to the subsequent user utterance includes:
generating the response based on a slot associated with the user utterance preceding the subsequent user utterance and the respective one of the plurality of skeleton utterances.

7. The method according to claim 3, wherein the subset of the plurality of skeleton utterances includes skeleton utterances generated for slot values in a slot ontology group corresponding to each slot in the user utterance preceding the subsequent user utterance.

8. The method according to claim 1, wherein the plurality of valid slot transition pairs comprises pairs of slot values that, when interchanged within a given utterance, produce distinct utterances that each have embedding values that when evaluated against each other have a calculated embedding distance that does not exceed an embedding distance threshold.

9. The method according to claim 1, wherein performing the pairwise analysis of potentially interchangeable slot values within each of the plurality of skeleton utterance groups includes:
identifying, by the one or more computers, a plurality of slot variables present in skeleton utterances associated with a target skeleton utterance group,
building, by the one or more computers, a set of potentially interchangeable slot pairs based on distinct pair combinations of the plurality of slot variables,
performing, by the one or more computers, the pairwise analysis on each potentially interchangeable slot pair of the set of potentially interchangeable slot pairs, and
determining, by the one or more computers, valid interchangeable slot pairs from the set of potentially interchangeable slot pairs based on results of the pairwise analysis on the each potentially interchangeable slot pair.

10. The method according to claim 9, wherein performing the pairwise analysis on each potentially interchangeable slot includes:
identifying, by the one or more computers, a first skeleton utterance and a second skeleton utterance of the plurality of skeleton utterances that corresponds to a first slot variable and a second slot variable in a target potentially interchangeable slot pair,
generating, by the one or more computers, a plurality of instances of the first skeleton utterance based on replacing the first slot variable in the first skeleton utterance with slot values corresponding to the target potentially interchangeable slot pair,
generating, by the one or more computers, a plurality of instances of the second skeleton utterance based on replacing the second slot variable in the second skeleton utterance with slot values corresponding to the target potentially interchangeable slot pair, and computing, by the one or more computers, a semantic similarity score for the plurality of instances of the first skeleton utterance and a semantic similarity score for the plurality of instances of the second skeleton utterance.

11. The method according to claim 10, wherein determining valid interchangeable slot pairs from the set of potentially interchangeable slot pairs includes:

determining, by the one or more computers, the target potentially interchangeable slot pair to be valid when the semantic similarity score computed for the plurality of instances of the first skeleton utterance and the second skeleton utterance exceeds a similarity score of the first skeleton utterance and the second skeleton utterance.

12. The method according to claim 10, wherein:

the first slot variable of the target potentially interchangeable slot pair corresponds to a first slot and the second slot variable of the target potentially interchangeable slot pair corresponds to a second slot, and generating the plurality of instances of the first skeleton utterance and the second skeleton utterance includes generating:

a first instance of the first skeleton utterance with the first slot installed at a location of the first slot variable in the first skeleton utterance, a second instance of the first skeleton utterance with the second slot installed at the location of the first slot variable in the first skeleton utterance, a first instance of the second skeleton utterance with the second slot installed at a location of the second slot variable in the second skeleton utterance, and a second instance of the second skeleton utterance with the first slot installed at the location of the second slot variable in the second skeleton utterance.

13. The method according to claim 1, wherein grouping the plurality of skeleton utterances into the plurality of skeleton utterance groups includes:

computing, by an embeddings model, an embedding value for each of the plurality of skeleton utterances, providing, to an unsupervised machine learning model, an input comprising the embedding value computed for each of the plurality of skeleton utterances, and generating, via the unsupervised machine learning model, the plurality of skeleton utterance groups based on the input.

14. The method according to claim 13, wherein:

the embedding value of a respective skeleton utterance relates to a vector comprising a plurality of numerical values that map semantic features of the respective skeleton utterance to a multi-dimensional space, and skeleton utterances with similar embedding values are grouped in a same skeleton utterance group.

15. The method according to claim 1, wherein:

the plurality of utterances is sourced from one or more knowledgebases obtained from a subscriber, and the one or more knowledgebases comprise unstructured utterance-answer data.

16. The method according to claim 15, wherein the one or more knowledgebases relate to one of a frequently asked questions (FAQ) repository, a hierarchical digital artifact repository, or website data.

17. A method for enhancing predictive dialogue inferences of a machine learning-based automated dialogue system, the method comprising:

at a remote machine learning-based automated dialogue service:

sourcing, into a dedicated knowledge database, a corpus of utterance data of a subscriber to the remote machine learning-based automated dialogue service, the corpus of utterance data comprising a plurality of utterances;

identifying, by a slot extraction machine learning model executed by one or more computers, a set of one or more slot values within each of the plurality of utterances;

converting, by the one or more computers, the plurality of utterances to a plurality of skeleton utterances by masking the set of one or more slot values identified within each of the plurality of utterances, wherein masking the set of one or more slot values includes replacing each identified slot value of the set of one or more slot values with a random slot variable;

grouping, by the one or more computers, the plurality of skeleton utterances into a plurality of skeleton utterance groups based on embedding values of the plurality of skeleton utterances;

identifying, by the one or more computers, a plurality of valid slot transition pairs based on a pairwise analysis of potentially interchangeable slot values;

deriving, by the one or more computers, a plurality of slot ontology groups based on the plurality of valid slot transition pairs;

using, by the one or more computers, the plurality of slot ontology groups and the plurality of skeleton utterances to configure the dedicated knowledge database, wherein configuring the dedicated knowledge database includes:

automatically encoding the dedicated knowledge database with a plurality of metadata transition values between distinct pairs of utterances of the plurality of utterances that digitally associates each of the distinct pairs of utterances as likely transitions in a given dialogue session between a user and an automated dialogue system operated by the machine learning-based automated dialogue service based on the plurality of slot ontology groups; and once encoded, implementing the dedicated knowledge database in a production environment that enables an execution of the automated dialogue system in a plurality of automated conversations using the plurality of metadata transition values of the dedicated knowledge base to automatically predict transitionary responses based on user utterances in multi-turn conversations that likely include a change in dialogue intents;

wherein the automated dialogue system is configured to (i) compute a likely dialogue intent for each user utterance received from the user and (ii) extract slot values from each user utterance received from the user, and using the plurality of slot ontology groups to generate a response to a subsequent user utterance received from the user includes:

identifying, by the one or more computers, the likely dialogue intent of a user utterance preceding the subsequent user utterance, generating, by the one or more computers, a plurality of semantic follow-up candidate utterances based on one or more slot ontology groups associated with the user utterance preceding the subsequent user utterance, computing, by the one or more computers, a plurality of classification scores for each of the plurality of semantic follow-up candidate utterances, the plurality of utterances, and at least a subset of the plurality of skeleton utterances, and generating, by the one or more computers, a response to the subsequent user utterance based on a highest classification score among the plurality of classification scores.

18. The method according to claim 17, wherein the subset of the plurality of skeleton utterances includes skeleton utterances generated for slot values in a slot ontology group corresponding to each slot in the user utterance preceding the subsequent user utterance.

19. A computer-program product embodied in a non-transitory machine-readable storage medium storing computer instructions that, when executed by one or more processors, perform operations comprising:

sourcing, into a dedicated knowledge database, a corpus of utterance data of a subscriber, the corpus of utterance data comprising a plurality of utterances;

identifying, by a slot extraction machine learning model, a set of one or more slot values within each of the plurality of utterances;

converting the plurality of utterances to a plurality of skeleton utterances by masking the set of one or more slot values identified within each of the plurality of utterances, wherein masking the set of one or more slot values includes replacing each identified slot value of the set of one or more slot values with a random slot variable;

grouping the plurality of skeleton utterances into a plurality of skeleton utterance groups based on embedding values of the plurality of skeleton utterances;

identifying a plurality of valid slot transition pairs based on a pairwise analysis of potentially interchangeable slot values;

deriving a plurality of slot ontology groups based on the plurality of valid slot transition pairs;

using the plurality of slot ontology groups and the plurality of skeleton utterances to configure the dedicated knowledge database, wherein configuring the dedicated knowledge database includes:

automatically encoding the dedicated knowledge database with a plurality of metadata transition values between distinct pairs of utterances of the plurality of utterances that digitally associates each of the distinct pairs of utterances as likely transitions in a given dialogue session between a user and an automated dialogue system based on the plurality of slot ontology groups; and once encoded, implementing the dedicated knowledge database in a production environment that enables an execution of the automated dialogue system in a plurality of automated conversations using the plurality of metadata transition values of the dedicated knowledge base to automatically predict transitionary responses based on user utterances in multi-turn conversations that likely include a change in dialogue intents;

wherein the automated dialogue system is configured to (i) compute a likely dialogue intent for each user utterance received from the user and (ii) extract slot values from each user utterance received from the user, and using the plurality of slot ontology groups to generate a response to a subsequent user utterance received from the user includes:

identifying the likely dialogue intent of a user utterance preceding the subsequent user utterance, generating a plurality of semantic follow-up candidate utterances based on one or more slot ontology groups associated with the user utterance preceding the subsequent user utterance, computing a plurality of classification scores for each of the plurality of semantic follow-up candidate utterances, the plurality of utterances, and at least a subset of the plurality of skeleton utterances, and generating a response to the subsequent user utterance based on a highest classification score among the plurality of classification scores.

20. The computer-program product according to claim 19, wherein when a classification score corresponding to a respective one of the plurality of semantic follow-up candidate utterances scores highest amongst the plurality of classification scores, generating the response to the subsequent user utterance includes:

generating the response based on the likely dialogue intent of the user utterance preceding the subsequent user utterance and a slot associated with the respective one of the plurality of semantic follow-up candidate utterances.

* * * * *